United States Patent [19]
Heibel et al.

[11] 3,973,578
[45] Aug. 10, 1976

[54] TANDEM CONTROL VALVE

[75] Inventors: Helmüt Heibel, Moschheim; Jorg Thielecke, Hillscheid, both of Germany

[73] Assignee: Girling Limited, Birmingham, England

[22] Filed: Feb. 19, 1975

[21] Appl. No.: 551,008

[30] Foreign Application Priority Data
Feb. 20, 1974 United Kingdom............... 7803/74

[52] U.S. Cl................................. 137/87; 303/6 C; 303/22 R
[51] Int. Cl.²......................................... B60T 8/22
[58] Field of Search............. 137/87; 303/6 C, 6 R, 303/22 R, 84 R; 188/349

[56] References Cited
UNITED STATES PATENTS

| | | | |
|---|---|---|---|
| 3,183,919 | 5/1965 | Herring | 303/84 R |
| 3,441,318 | 4/1969 | Bueler | 303/6 C |
| 3,825,308 | 7/1974 | Kasselmann | 303/6 C |

*Primary Examiner*—Robert G. Nilson
*Attorney, Agent, or Firm*—Scrivener parker Scrivener and Clarke

[57] ABSTRACT

A pressure control valve for a braking system having two separate pressure circuits comprises two valves for connection in the respective circuits. Each valve has a valve closure member, the members being axially aligned and coupled together for movement in unison for simultaneous opening and closing of the valves.

6 Claims, 5 Drawing Figures

TANDEM CONTROL VALVE

This invention relates to fluid pressure control valves for controlling pressure in circuits of a vehicle braking system having separate pressure sources.

It is known to employ in such systems pressure reducing or limiting valves in the respective pressure lines leading to the rear wheel brakes to reduce the tendency for the rear wheels to lock under heavy braking conditions.

In the event of one pressure source failing, it is desirable to increase the pressure which can be transmitted from the remaining pressure source to the rear wheel brakes, and the present invention provides a control valve which is designed to cater for this requirement.

In accordance with the present invention, there is provided a pressure control valve for a braking system having separate pressure circuits, comprising a housing, a primary valve having an inlet and an outlet for connection in one circuit and a valve closure member movable in one direction to close the primary valve, and a secondary valve having an inlet and an outlet for connection in another circuit and a valve member movable in said one direction to close the secondary valve, wherein the valve members are axially aligned and arranged for movement in unison for simultaneous opening or closing of the primary and secondary valves.

Preferably the two valve closure members are connected together in a manner permitting of the adjustment of their axial spacing to suit the spacing of the respective valve seats with which they co-operate, thus simplifying manufacture of the valve.

Some presently preferred forms of control valve in accordance with the invention will now be described, by way of example, with reference to the accompanying drawings, in which.

All of the valves illustrated are designed for incorporation in dual or split circuit vehicle pressure braking systems. Corresponding parts of the different valves are identified by the same reference numerals in the different Figures.

Figure 1:
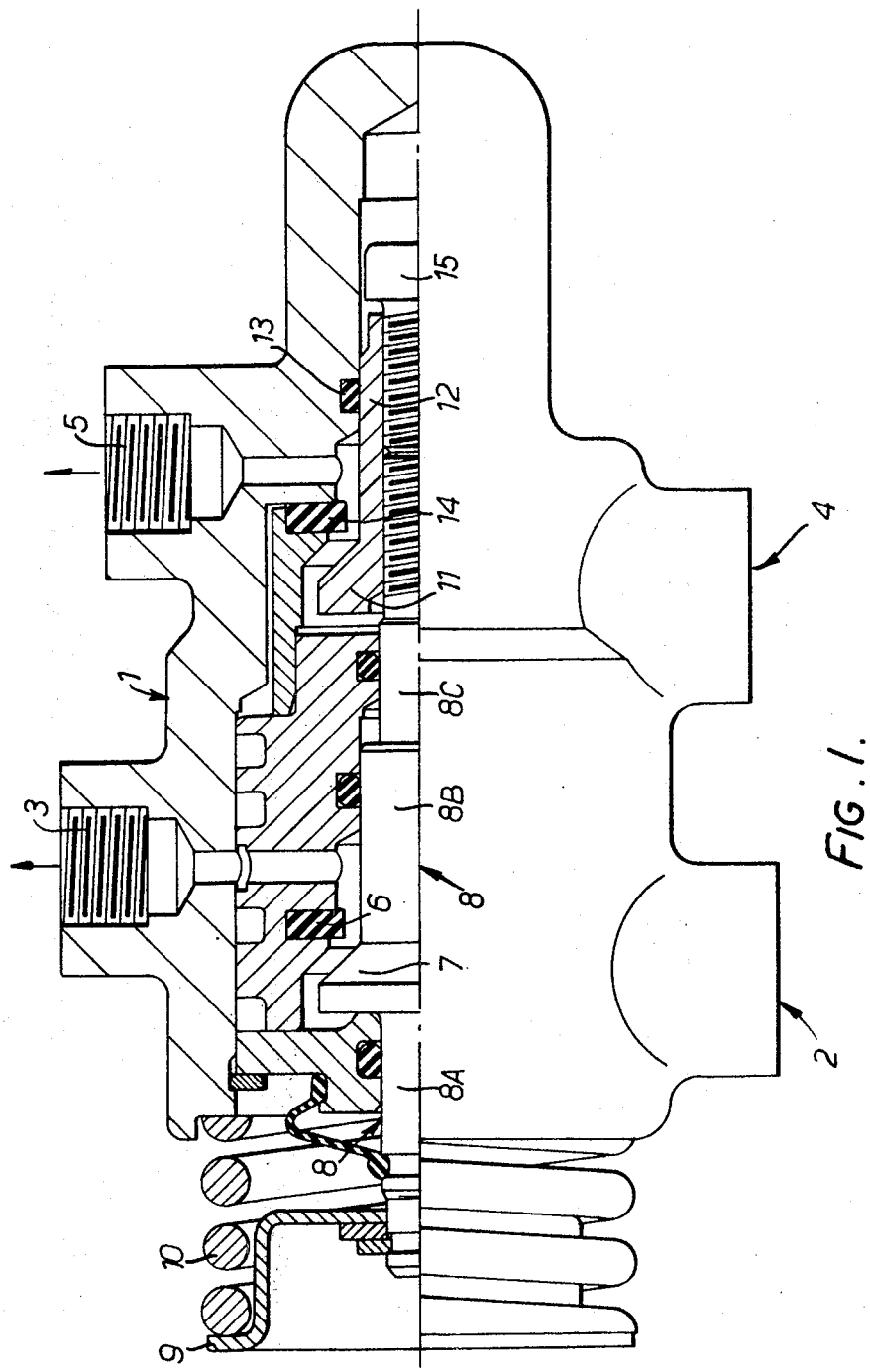
FIG. 1 is a half-sectional elevation of one form of valve.

The valve shown in FIG. 1 comprises a housing 1 having an inlet 2 and outlet 3 for a primary control valve, and a second inlet 4 and outlet 5 for a secondary control valve. Communication between the inlet 2 and outlet 3 is controlled by a valve set comprising a stationary annular valve seat 6 and a frusto-conical valve head 7 carried by a stem 8 having sealed diameter portions 8A, 8B and 8C. The outer portion 8A projects externally of the housing and carries a spring abutment cup 9 engaged by one end of a prestressed compression spring 10 constituting a valve control spring which biases the stem 8 to its illustrated, open position.

The primary and secondary valves are hydraulically separated from each other by the seal around stem portion 8C. The end of stem 8 beyond the portion 8C is screw threaded to receive a secondary valve member having a frusto-conical head 11 and a plain portion 12 of reduced diameter slidably sealed at 13. The head 11 co-operates with a stationary annular valve seat 14.

On assembly of the valve, the secondary valve member is threaded along the stem 8 until the axial spacing of the valve heads 7 and 11 exactly matches the spacing of valve seats 6 and 14, the secondary valve member being locked in this position by a locking screw member 15.

In use, the inlets 2 and 4 are connected to the respective pressure sources of a dual pressure braking system, and the outlets 3 and 5 to the rear wheel brakes of the system. When the brakes are applied, pressure fluid is first transmitted freely through the open valves to the respective outlets, but unbalanced hydraulic thrusts are developed on the stem 8, due to the differences in the sealed diameters of portions 8A and 8C on the one hand, and portions 8B and 12 on the other, the unbalanced hydraulic thrust tending to close the valves by moving the stem inwardly (to the right), and the valves close when this thrust is sufficient to overcome the opposing force exerted by control spring 10. The outlets are thus isolated from the inlets, so that no further pressure increase can take place at the outlets. The pressure applied to the rear wheel brakes is thus limited at a predetermined value, to reduce the risk of the rear wheels locking.

In the event of either pressure system failing, the hydraulic thrust forces on the stem 8 are halved, for any given inlet pressure, so that the pressure at which the valve closes is twice the cutoff pressure in normal operation. This permits higher braking efforts to be applied in the still operative pressure spaces of the rear wheel brakes, to compensate for the loss of effort in the other pressure spaces.

Figure 2:
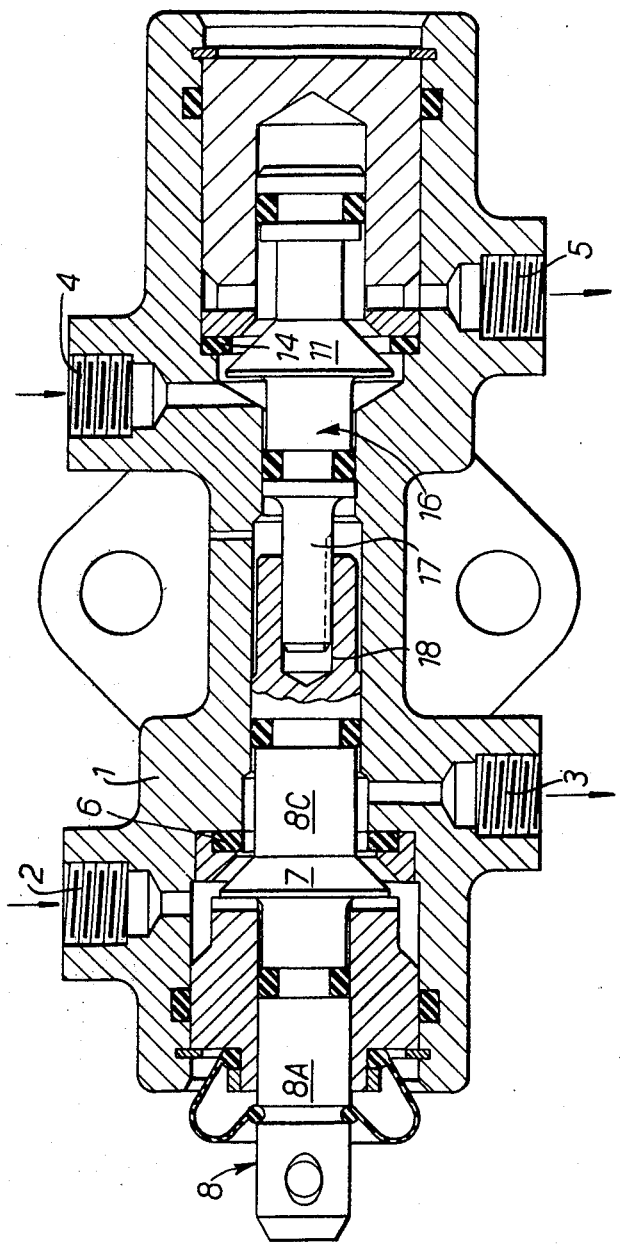
FIGS. 2 and 3 are sectional elevations of two further forms of valve.

The valve shown in FIG. 2 is generally similar to that of FIG. 1, except for the following main points of difference. The projecting portion of the valve stem 8 is shown adapted for connection to an external control spring in the form of a tension spring which can have its preload varied in accordance with variations in the loading of the vehicle, in a manner known in itself. The secondary valve member is formed as a unitary member having its own sealed plunger portion 16, equal in diameter to the stem portion 8A. Between the seals on stem portion 8C and plunger portion 16, the secondary valve member has a spigot 17 which is an interference fit in an axial bore 18 formed in the confronting end of stem portion 8C.

On assembly of the valves, the stem is pressed inwardly until both valve heads 7 and 11 are firmly engaged with their respective valve seats, the interference fit of the spigot 17 in bore 18 thereafter ensuring that this setting of the valve head spacing is maintained. Operation of the valve is exactly as described in relation to the first embodiment.

Figure 3:
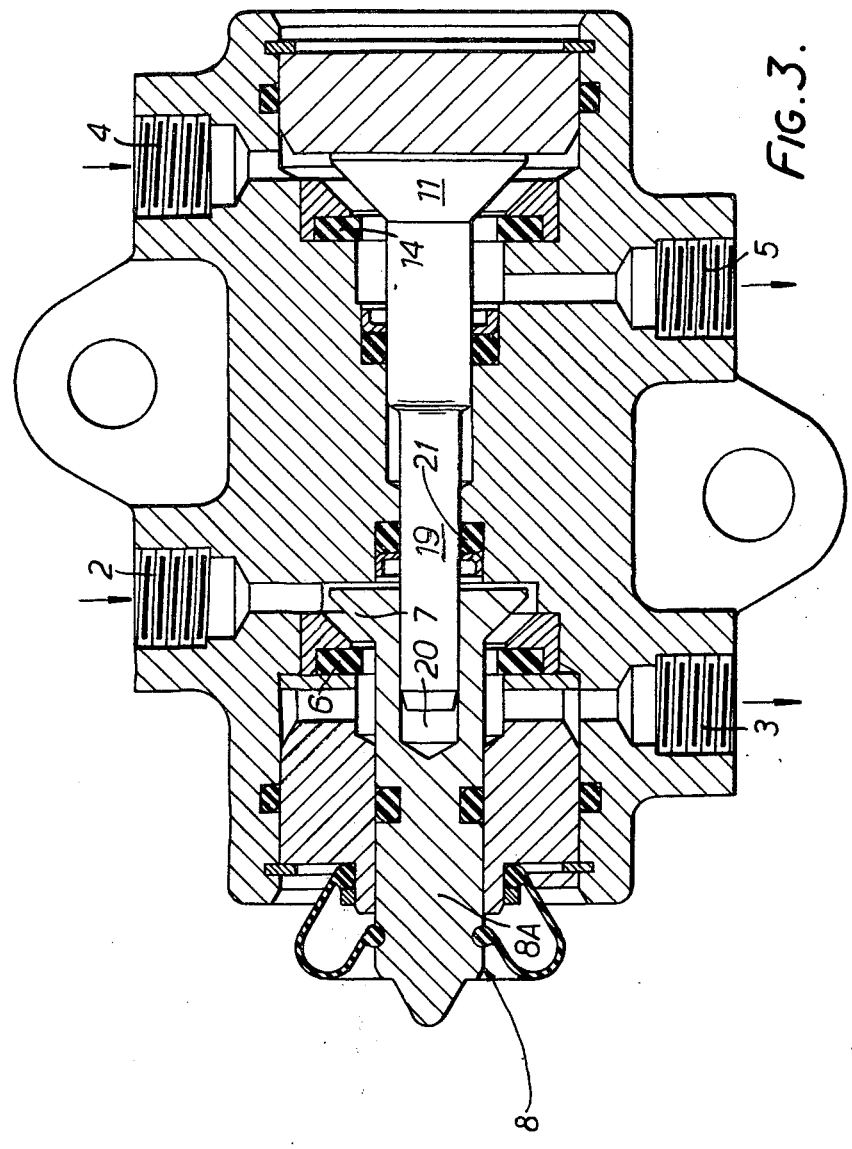

In the valve shown in FIG. 3, the stem 8 has only one sealed portion at 8A, and the secondary valve member has a spigot 19 received with an interference fit in an axial bore 20 in the stem. The spigot is slidably sealed at 21. In this case, the stem 8 is subject to the action of an inwardly directed control spring force, preferably variable in accordance with changes in vehicle loading.

The valve is identical in function with those described above, pressure in the inlets of the primary and secondary valves applying an unbalanced hydraulic thrust which closes the valves when the total thrust is sufficient to overcome the force of the control spring.

It will be seen that, in each of the above described embodiments, the closure members of the primary and secondary valves are mounted together for movement in unison, so as to effectively form part of a unitary plunger, but in a manner permitting of their initial relative axial spacing to ensure simultaneous closing and opening of the flow paths through the valves.

We claim:

1. A pressure control valve for a braking system having separate pressure circuits, comprising a housing, a primary valve having an inlet and an outlet for connection in one said circuit and a first valve closure member movable in one direction to close said primary valve, and a secondary valve having an inlet and an outlet for connection in another said circuit and a second valve closure member movable in said one direction to close said secondary valve, said valve closure members are axially aligned and arranged for movement in unison for simultaneous opening or closing of said primary and secondary valves, said primary and secondary valves including respective valve seats which are axially spaced apart, said valve closure members co-operating respectively with said valve seats, and wherein said valve closure members are connected together in a manner permitting the adjustment of their axial spacing to correspond to the axial spacing of the valve seats.

2. A control valve according to claim 1, wherein said first valve closure members has a screw threaded portion on to which is screwed said valve second valve closure.

3. A control valve according to claim 2, wherein said second valve closure member has means defining an internally threaded through bore, one end of which is screwed on to said screw-threaded portion of said first valve closure member, and further including a locking screw member which is screwed into the other end of said bore of said second valve closure member, said locking screw member being engageable within said bore with one end of said first closure member to lock said valve closure members against relative axial movement.

4. A control valve according to claim 1, wherein said first valve closure members has an axially extending spigot portion, and said second valve closure member has means defining an axial bore said spigot portion being an interference fit within said bore of said second valve closure member.

5. A control valve according to claim 1, including means biasing said valve closure members in a direction to open said primary and secondary valves, and pressure responsive areas exposed to pressures at the respective inlets and acting on said valve closure members in a direction to close said primary and secondary valves, said pressure responsive areas being arranged that the inlet pressure required to overcome said biasing means and close said valves when the inlet of only one valve is subjected to pressure is substantially twice the inlet pressure of said one valve required when inlets of both valves are subjected to pressure.

6. A pressure control valve for a braking system having separate pressure circuits, comprising a housing, a primary valve having an inlet and an outlet for connection in one said circuit and a first valve closure member movable in one direction to close said primary valve, and a secondary valve having an inlet and an outlet for connection in another said circuit and a second valve closure member movable in said one direction to close said secondary valve, said valve closure members being axially aligned and arranged for movement in unison for simultaneous opening or closing of said primary and secondary valves, means biasing said valve closure members in a direction to open said primary and secondary valves, and pressure responsive areas exposed to pressures at the respective inlets and acting on said valve closure members in a direction to close said primary and secondary valves, said pressure responsive areas being arranged that the inlet pressure required to overcome said biasing means and close said valves when the inlet of only one valve is subjected to pressure is substantially twice the inlet pressure of said one valve required when inlets of both valves are subjected to pressure.

* * * * *